May 30, 1950      C. C. ELSON      2,509,816
BRAKE TESTING APPARATUS
Filed April 19, 1945      2 Sheets-Sheet 1
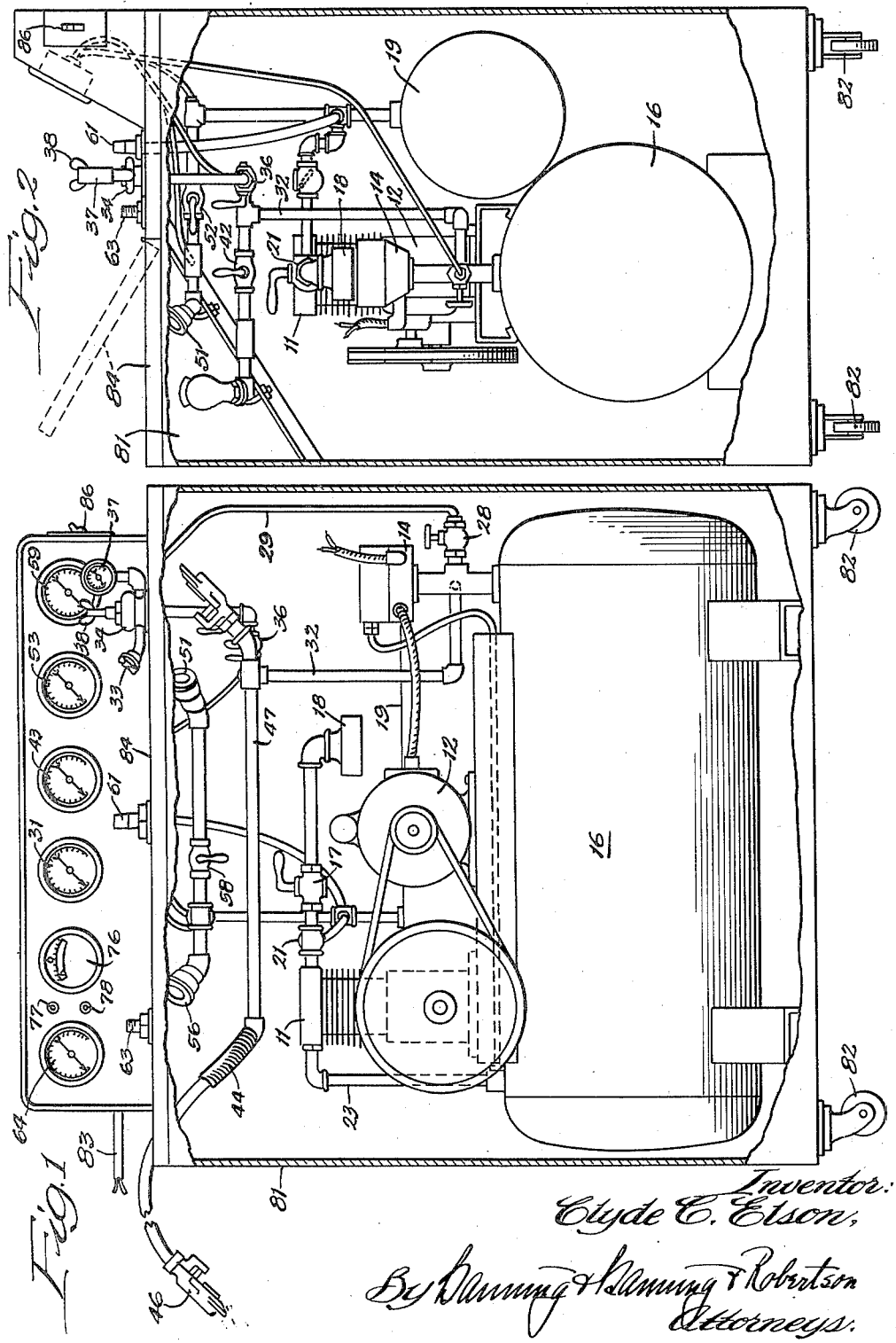
Inventor:
Clyde C. Elson,
By Danning & Danning & Robertson
Attorneys.

May 30, 1950 C. C. ELSON 2,509,816
BRAKE TESTING APPARATUS
Filed April 19, 1945 2 Sheets-Sheet 2
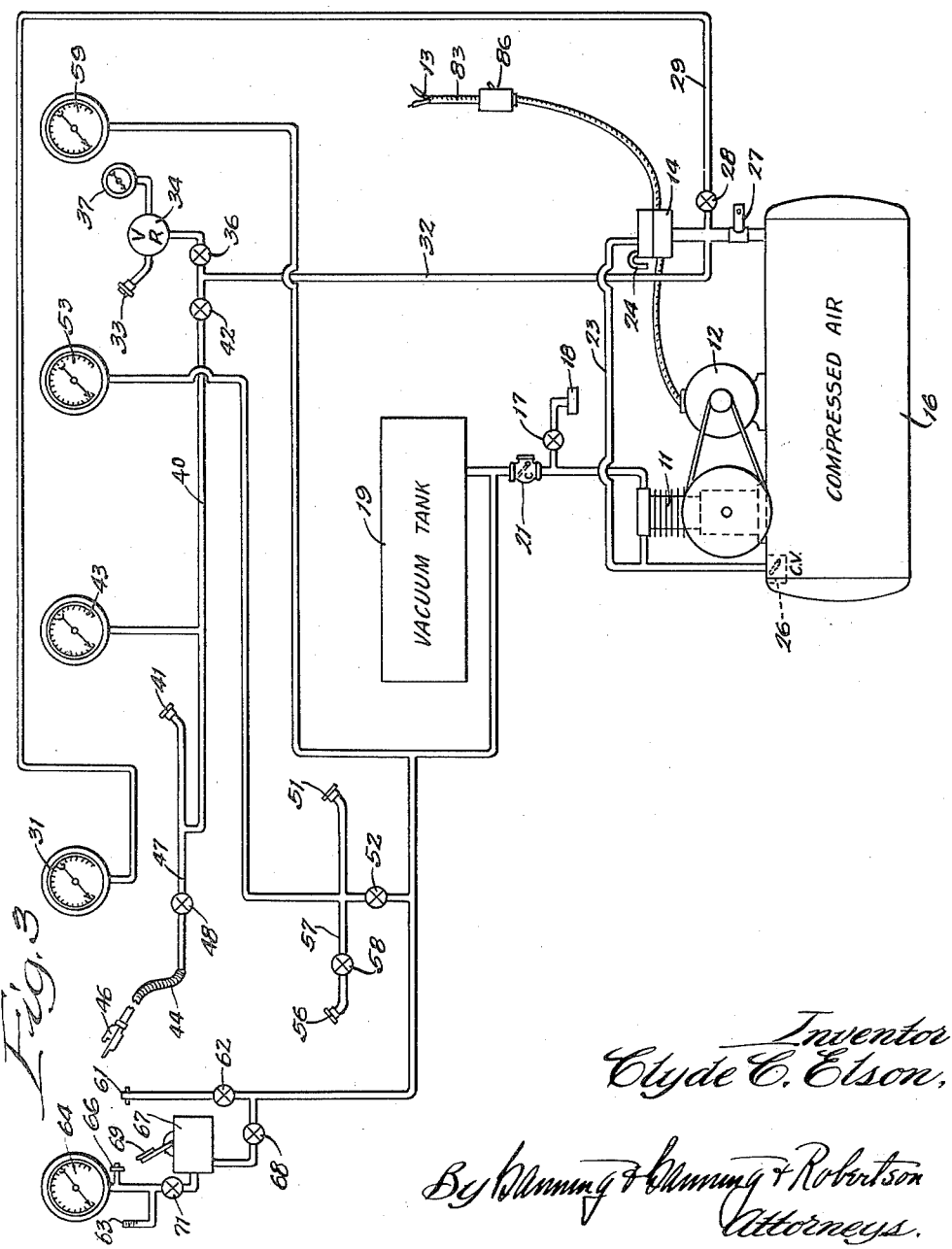
Inventor:
Clyde C. Elson,
By Manning & Manning & Robertson
Attorneys.

Patented May 30, 1950

2,509,816

UNITED STATES PATENT OFFICE 2,509,816

BRAKE TESTING APPARATUS

Clyde C. Elson, Chicago Heights, Ill.

Application April 19, 1945, Serial No. 589,165

4 Claims. (Cl. 73—39)

For testing brakes on busses, trucks, tractor-trailer combinations and the like, it has been necessary heretofore to use a large variety of equipment. Sometimes the brakes are operated by air pressure, sometimes by vacuum, other times the brakes are hydraulically or electrically operated. Occasionally two kinds of brakes will be used on the same vehicle, especially when one kind is used on a trailer and the other on the tractor which it pulls.

According to the present invention, a single test stand is provided for testing a variety of brakes. Furthermore a single pump is used in this stand for supplying both air pressure and vacuum whereby to maintain both vacuum and pressure ready for use at the same time. Furthermore, the same source of supply may be used when desired for developing hydraulic pressure, as hereinafter set forth in detail.

Additional objects and advantages of the invention will be apparent from the following description and from the drawings; in which Fig. 1 is a front elevational view, partly broken away, of the form of the invention chosen for illustration;

Fig. 2 is a side elevational view of the same with the enclosing cabinet partly broken away; and Fig. 3 is a diagrammatic illustration of the invention, including some additional features.

In the illustrated form of the invention a pump 11 is driven by a motor 12 which is supplied with electric power from supply lines 13. The motor 12 is controlled by a switch in the control unit 14.

The output side of pump 11 is connected to a pressure tank 16 so that this tank can be filled with compressed air by pump 11. When it is desired to fill this tank a valve 17 will be opened to let air into the pump 11 freely through the silencer and cleaner 18.

The pump 11 can also be connected to a vacuum tank 19 to draw air from the vacuum tank so as to create a partial vacuum therein. For this purpose the valve 17 is closed so that the pump 11 can obtain air only from the vacuum tank 19. This can be done at the same time air is being compressed into tank 16, but for more efficient pumping it is preferred to evacuate tank 19 while the pressure in the pressure tank 16 is still quite low.

A check valve 21 is connected between the vacuum tank 19 and the intake cleaner 18 so that when the motor 11 is stopped, or the valve 17 is opened air cannot flow back into the vacuum tank 19.

Control unit 14 is connected to the compressed air tank 16 for shutting off the motor 12 when the pressure in the tank 16 reaches a predetermined value. At the same time that the control unit 14 shuts off the motor 12 it will connect relief pipe 23 to a vent 24 so as to relieve the pump 11 of compression in order that it may be started more easily when the control unit 14 again connects motor 12. A check valve 26 will prevent the compressed air in compressed air tank 16 from flowing out through relief pipe 23.

The compressed air tank 16 has connected thereto a safety valve 27 which will permit the escape of compressed air before a danger point is reached, if the control unit 14 should fail to shut off the motor 12.

Through valve 28, which is normally left open, and pipe 29, the compressed air tank has connected thereto a pressure gauge 31 which thus shows the pressure of the air in the tank 16.

A pressure line 32 also leads to the test equipment. This equipment includes a connecting coupler 33 which is connected to the pressure line 32 through a reducing valve 34 and a manual valve 36. The reducing valve is connected to a gauge 37 in the usual way. By turning the handle 38 of the reducing valve (Fig. 1) the pressure which will be supplied to a coupler 33 can be regulated, the value of this pressure being shown on a gauge 37. This coupler 33 may be of any form adapted for connection with various small instruments which it may be desired to adjust or test. It could simply be a threaded nipple.

Also branching off from pipe 32 is a pipe 40 communicating with a quick coupler 41 which is of the type standard on trailers and trucks where such couplers are used. It is also the type used on railroads.

The hose of a trailer or the like which normally couples with the tractor can be uncoupled from the tractor and coupled to the coupler 41. Of course, an extension hose may be used where necessary. A hand valve 42 may then be opened to supply any amount of air to the brake system of the vehicle being tested, the amount of pressure being indicated by the gauge 43.

The coupler 41 is also connected by a pipe 47 to a flexible tube 44 which at its end is provided with a coupler 46 adapted to be applied to the coupler on the tractor from which has been removed the coupler which has been applied to the coupler 41. In other words the pipe 47 is interposed within the braking system of the vehicle between its source of braking energy and a brake. By opening the valve 48 and closing the valve 42, the braking system of the vehicle can be operated in the normal way and the pressure developed will be indicated on the gauge 43. Thus the operator can first test the braking system in this way. If the pressure developed by the pressure system of the car is not adequate he may close the valve 48 and open the valve 42 and test the brakes with proper pressure. Instead of the valve 48 the coupler 46 may be closed by coupling thereto a dummy or plugged coupler.

In the vacuum testing system the couplers 51 and 56 may be used in the same way as couplers 41 and 46, control valves 52 and 58 corresponding to control valves 42 and 48 and the vacuum gauge 53 corresponding to the pressure gauge 43. Thus with the valve 52 closed and the valve 58 opened, the vacuum brake system can be tested and the degree of vacuum developed and applied can be observed on the gauge 53. If the vacuum is inadequate, the valve 58 can be closed and the valve 52 opened to apply a higher vacuum to the brake system from the vacuum tank 19. The degree of vacuum applied is indicated by gauge 53. A gauge 59 indicates the degree of vacuum in the vacuum tank 19.

For testing smaller parts a coupler 61 is provided. Vacuum can be applied to the coupler 61 by a manual valve 62.

For testing hydraulic brakes a coupler 63 is provided to which a bleeder on the hydraulic line of a brake system can be connected by a suitable hose. The coupler 63 is connected to a hydraulic pressure gauge 64, a bleeder valve 66 preferably being provided to insure proper operation of the pressure gauge 64.

If desired the coupler 63 and gauge 64 may also be connected with a booster or converter 67 which is connected to the vacuum system through a valve 68. Optionally the booster may be used with the pressure system. By operation of the lever 69 a high hydraulic pressure can be applied to the coupler 63 and gauge 64 just as in operating the brake system of the vehicle. When it is not desired to use the booster 67 a valve 71 will be closed. In some units it may be desired to omit the booster 67 in which case there would be no connection between the coupler 63 and the vacuum system and the valve 71 therefore will not be necessary.

For testing electric brakes an ammeter 76 is connected between jacks 77 and 78 (see Fig. 1). Electric cables may be plugged into these jacks 77 and 78. Electric cables may be plugged into these jacks for connecting the ammeter 76 in series in the electrical brake control circuit. The ammeter thus will show the amount of current which is applied to the brakes and if there should be any break in the circuit the ammeter would register 0. If there is a short circuit, the ammeter will read 0 or very high, depending on the position of the short circuit.

The entire apparatus is preferably carried by a cabinet 81 which is desirably mounted on wheels or casters 82 so that it may be moved close to the vehicle being tested, a flexible cord 83 being used for connection to the power source.

When the apparatus is to be used where electrical power is not available the electric motor 12 may be replaced by a small gasoline engine.

For the sake of neatness the various valves and couplers are preferably positioned in the cabinet, access being had to them by removing or raising cabinet top 84.

General Operation

When the flexible cord 83 has been plugged in, the main switch 86 will be turned on to start the motor 12. Ordinarily the valve 17 will be closed so that the motor will evacuate vacuum tank 19. This tank is smaller than compressed air tank 16 and hence the air evacuated does not build up much air pressure in tank 16. When the desired degree of vacuum is in tank 19 valve 17 will be opened and atmospheric air will be pumped into tank 16. When the predetermined degree of pressure is built up in tank 16, automatic control unit 14 will shut off the motor 12.

For ordinary testing of vacuum or air brakes the pipe 57 or pipe 47 respectively will be connected into the brake line with the valve between this pipe and the vacuum or pressure tank closed. Thus if a vacuum system is being tested the valve 52 will be closed and the valve 58 opened. The vacuum which the vehicle system applies to the brake will than be indicated by gauge 53. If the vacuum is inadequate valve 58 may be turned off and valve 52 opened to supply additional vacuum to the brake system, the vacuum then applied being indicated by gauge 53.

In case a hydraulic system is being tested the hydraulic line will be connected, as through a bleeder valve, to coupler 63 so that the hydraulic pressure can be indicated on gauge 64. If more pressure is needed it can be supplied through a booster or a converter 67.

Electric brakes can be tested by plugging connecting wires into jackets 77 and 78 to connect the ammeter in series in the brake-applying circuit.

I claim:

1. Brake testing apparatus for different types of brakes including a source of compressed air, a source of vacuum, test apparatus connected with each of said sources and each including a separate conduit having separate controlled branches, couplers adapted to connect said branches of the conduit into the brake system of a vehicle in series between the vehicle's source of braking energy and the brakes for testing the brakes independently of said source of energy and also for testing the source of energy in the normal operation of the brakes, and a pressure gauge in each conduit connected with the vacuum and pressure sources to indicate the pressure or vacuum developed by the vehicle's source of braking energy.

2. Brake testing apparatus for different types of brakes comprising a source of compressed air, a source of vacuum, test apparatus connected with each of said sources and each including a separate conduit having separate controlled branches, couplers adapted to connect said branches of the conduit into the brake system of a vehicle in series between the vehicle's source of braking energy and the brakes for testing the brakes independently of said source of energy and also for testing the source of energy in the normal operation of the brakes, a pressure gauge in each conduit connected with the vacuum and pressure sources to indicate the pressure or vacuum developed by the vehicle's source, and valve means operable for supplying additional braking energy from the selected connected source to the selected tested brake system, and one of said pressure gauges then indicating the pressure thus supplied.

3. Brake testing apparatus for different types of brakes comprising a source of compressed air, a source of vacuum, test apparatus connected with each of said sources and each including a separate conduit having separate controlled branches, couplers adapted to connect said branches of the conduit into the brake system of a vehicle in series between the source of braking energy and the brakes for testing the brakes independently of said source of energy and also for testing the source of energy in the normal operation of the brakes, a pressure gauge in each conduit connected with the vacuum and pressure sources to indicate the pressure or vacuum developed by the vehicle braking system, and valve means operable for supplying additional braking energy from the selected connected source to the selected brake system, one of said pressure gauges then indicating the pressure thus supplied, a hydraulic pressure gauge, means for connecting the hydraulic pressure gauge to the hydraulic brake system of the vehicle, and means actuated by energy from one of the two said sources for applying additional hydraulic pressure to the last mentioned gauge and vehicle system as desired.

4. Brake testing apparatus for different types of brakes comprising a source of compressed air, a source of vacuum, test apparatus connected with each of said sources and each including a separate conduit having separate controlled branches, couplers adapted to connect said branches of the conduit into the brake system of a vehicle in series between the vehicle's source of braking energy and the brakes for testing the brakes independently of said source of energy and also for testing the source of energy in the normal operation of the brakes, a pressure gauge connected to the conduit to indicate the pressure developed by the vehicle's source, and valve means for supplying additional braking energy from the connected source, said pressure gauge then indicating the pressure thus supplied, and a reducing valve connected with said compressed air source.

CLYDE C. ELSON.

REFERENCES CITED

The following references are of record in the file of this patent:

UNITED STATES PATENTS

| Number | Name | Date |
|---|---|---|
| 1,185,944 | Schley | June 6, 1916 |
| 1,777,423 | Zeder | Oct. 7, 1930 |
| 1,855,135 | Meier | Apr. 19, 1932 |
| 1,970,211 | Wilkoff | Aug. 14, 1934 |
| 2,310,974 | Lumm | Feb. 16, 1943 |
| 2,316,217 | Birch | Apr. 13, 1943 |
| 2,332,725 | Jordan | Oct. 26, 1943 |